United States Patent
Landphair et al.

(10) Patent No.: US 8,504,310 B2
(45) Date of Patent: Aug. 6, 2013

(54) PARTICULATE FLOW SENSING FOR AN AGRICULTURAL IMPLEMENT

(75) Inventors: Donald K. Landphair, Bettendorf, IA (US); James J. Phelan, Bettendorf, IA (US); James Z. Liu, Belvidere, IL (US)

(73) Assignee: Deere & Company, Moline, IL (US)

( * ) Notice: Subject to any disclaimer, the term of this patent is extended or adjusted under 35 U.S.C. 154(b) by 809 days.

(21) Appl. No.: 12/535,986

(22) Filed: Aug. 5, 2009

(65) Prior Publication Data

US 2011/0035163 A1 Feb. 10, 2011

(51) Int. Cl.
- *G01F 1/05* (2006.01)
- *G01F 1/07* (2006.01)
- *G01F 1/08* (2006.01)
- *G01F 1/20* (2006.01)

(52) U.S. Cl.
USPC .................... 702/45; 702/48; 702/49; 702/50

(58) Field of Classification Search
USPC ............... 702/28, 45, 48, 49, 50, 54, 82, 108, 702/128; 310/345; 340/684
See application file for complete search history.

(56) References Cited

U.S. PATENT DOCUMENTS

| | | |
|---|---|---|
| 3,595,078 A | 7/1971 | Beck et al. |
| 3,730,395 A | 5/1973 | Gallogly et al. |
| 3,844,174 A | 10/1974 | Chabre |
| 4,000,398 A | 12/1976 | Conner |
| 4,079,362 A | 3/1978 | Grimm et al. |
| 4,238,790 A | 12/1980 | Balogh et al. |
| 4,280,419 A | 7/1981 | Fischer |
| 4,401,909 A | 8/1983 | Gorsek |
| 4,651,331 A | 3/1987 | Harrsen et al. |
| 4,719,805 A | 1/1988 | Volk et al. |
| 4,933,589 A | 6/1990 | Strubbe |
| 5,065,632 A | 11/1991 | Reuter |
| 5,177,470 A | 1/1993 | Repas |
| 5,295,383 A * | 3/1994 | Kirii et al. ...................... 72/351 |
| 5,343,761 A | 9/1994 | Myers |
| 5,561,250 A | 10/1996 | Myers |
| 5,598,794 A | 2/1997 | Harms et al. |
| 5,650,609 A | 7/1997 | Mertins et al. |
| 5,831,539 A | 11/1998 | Thomas et al. |

(Continued)

FOREIGN PATENT DOCUMENTS

| | | |
|---|---|---|
| EP | 0339142 | 11/1989 |
| EP | 1744031 | 1/2007 |

OTHER PUBLICATIONS

European Search Report received Jun. 6, 2011 (4 pages).

*Primary Examiner* — Michael Nghiem
*Assistant Examiner* — Felix Suarez (57) ABSTRACT

An impact sensor is located in a distribution tower which divides the seed and/or nutrient flow into individual rows, and a second sensor provides a compensation signal dependent upon one or more variables such as the velocity of the air in the conveying system, implement vibrations. As the seed/fertilizer bounces off of the impact sensor and flows into the individual row air streams, the impact sensor provides a force signal to a processor which calculates the total particulate mass flow rate from the force signal and the air velocity signal. To determine individual seed and fertilizer rates, a rate controller temporarily changes the metering rate of one of the materials, and the processor then calculates the desired information from the mass flow change and meter speed change. Another embodiment includes seed sensor structure at the meter output for achieving or confirming accuracy.

19 Claims, 4 Drawing Sheets

U.S. PATENT DOCUMENTS

| | | | |
|---|---|---|---|
| 5,831,542 A * | 11/1998 | Thomas et al. | 340/684 |
| 5,923,262 A | 7/1999 | Fuss et al. | |
| 5,993,516 A | 11/1999 | Benneweis et al. | |
| 5,996,516 A * | 12/1999 | Benneweis et al. | 111/176 |
| 6,081,224 A | 6/2000 | Rosenbrock | |
| 6,093,926 A | 7/2000 | Mertins et al. | |
| 6,192,813 B1 | 2/2001 | Memory et al. | |
| 6,213,690 B1 | 4/2001 | Gregor et al. | |
| 6,285,938 B1 | 9/2001 | Lang et al. | |
| 6,296,425 B1 | 10/2001 | Memory et al. | |
| 6,367,336 B1 * | 4/2002 | Martina et al. | 73/861.74 |
| 6,505,569 B1 | 1/2003 | Richard | |
| 6,516,676 B1 | 2/2003 | Mullowney, Jr. | |
| 6,584,920 B1 | 7/2003 | Cresswell | |
| 6,644,225 B2 | 11/2003 | Keaton | |
| 6,661,514 B1 | 12/2003 | Tevs et al. | |
| 7,073,314 B2 | 7/2006 | Beck et al. | |
| 7,182,029 B2 | 2/2007 | Johnson et al. | |
| 2004/0249583 A1 * | 12/2004 | Eryurek et al. | 702/47 |

* cited by examiner

PARTICULATE FLOW SENSING FOR AN AGRICULTURAL IMPLEMENT

FIELD OF THE INVENTION

The present invention relates generally to air seeders and, more specifically, to mass flow sensors for such seeders.

BACKGROUND OF THE INVENTION

Air Seeding machines include a metering device which regulates that amount of seed and fertilizer that is dispensed into an air stream. The air stream conveys the seed and/or fertilizer to a secondary tower which divides the flow of materials into individual row air streams for delivery to furrows made in soil by a furrow opener. The current technology metering devices meter the seed or granular fertilizer on a volumetric basis. In order to achieve an acceptable degree of metering accuracy, the metering device must be calibrated in accordance with the density of the material being metered. The calibration procedure, which typically includes a manual weighing step, can be time consuming and, depending upon the skill level of the operator, can be inaccurate and result in reduced productivity. When more than one material is being conveyed, only one of the materials can be metered at a time during the calibration procedure and presents added difficulties when attempting to provide a calibration system that can operate on-the-go.

SUMMARY OF THE INVENTION

To eliminate a manual calibration step, a mass flow rate sensor is placed in the air stream of an air seeder or similar implement that conveys materials such as seed and fertilizer. The mass flow rate sensor reduces calibration delays and provides more accurate seeding and fertilizing rates, even when the seed and fertilizer are combined into one air stream.

In one embodiment of the invention, a mass flow rate sensor is located in the secondary tower used to divide the seed and/or fertilizer flow into individual rows. The metered materials bounce off of the sensor, change direction and then flow into the individual row air streams. The sensor provides a signal indicative of the force of the material against the sensor which is dependent mainly on material mass and velocity. A processor calculates mass flow rate from the force signal. The processor also receives at least one additional signal indicative of unwanted noise and/or interference or other variable that can adversely affect the calculated mass flow rate. The additional signal is utilized to provide a correction signal and calculate a more accurate mass flow rate. Factors such as air velocity variations, implement vibration, air flow induced vibrations, air pressure drop, and differential pressure variation can be detected by one or more transducers connected to the processor. In one embodiment, an air flow velocity sensor can be utilized since the air velocity affects the velocity of the seed/fertilizer in the secondary tower and the impact force against the mass flow sensor. The air flow velocity signal is utilized to provide a correction of the force sensor signal to compensate for air velocity and more accurately reflect mass flow.

A single mass sensor or multiple sensors up to the number of secondary towers can be used. If the number of sensors is less than the number of secondary towers, one sensor acts as a proxy for other secondary towers.

Some implement configurations result in seed and fertilizer being mixed in the same air stream and in the secondary tower. To separate the seed mass flow indication from the fertilizer mass flow indication, the processor employs a software algorithm to temporarily increase the metering rate of one of the materials. The change in mass flow rate is then calculated. Using the mass flow rate change and the meter speed change, a calibration factor is determined from which the approximate rate of the individual materials can be calculated. The procedure allows on-the-go calibration of multiple meters and can provide such calibration without the need to completely stop one of the materials if so desired.

In those implement configurations that result in seed and fertilizer being mixed in the same air stream and in the secondary tower, sensor structure can be mounted below each meter to provide separate information relevant to seed and fertilizer mass flow. The additional mass flow sensor structure provides signals for compensating for and/or confirming the accuracy of the first mass flow sensor and allows more accurate on-the-go calibration of multiple meters. Many factors influence flow measuring accuracy, and providing the additional sensor structure at a different location than that of the first sensor can improve operation significantly.

By providing one or more interference or air flow signals in addition to the mass sensor signal from the impact plate which faces the primary mass flow, the processor can negate the detrimental effects of air flow and/or pressure variations, vibrations and various other extraneous factors. For example, in one embodiment of the invention, a vibration sensor is connected to the impact plate of the mass sensor. During brief interruptions of material flow from the metering device, average vibration signals from the air flow and implement movement can be determined by the processor, and these signals can be subtracted from the total mass flow sensor signal generated when material flows in the system to provide a more accurate indication of mass flow.

Additional mass flow sensor structure can include an intrusive mass flow sensor such as a centripetal force or Coriolis sensor, or a non-intrusive sensor such as an optical sensor can be used. In certain conditions, such sensors can be used independently to achieve the desired accuracies. In more difficult detection environments, the additional mass flow sensor structure can be placed under the metering devices for compensating for and/or confirming the accuracy of the mass flow sensor.

In one embodiment of the invention, a closed loop control system utilizes the mass flow rate to adjust the metering rate for achieving desired flow rate. For example, a method of accurately providing the flow rate includes the following steps:
 1. programming the desired mass flow rate for seed and/or nutrients;
 2. adjusting the controller to set the metering device at a nominal mass flow rate using an approximate standard meter calibration value;
 3. providing a calibration cycle; and
 4. utilizing the information from the calibration cycle to refine the calibration value and readjusting the metering rate to a precise metering rate.

By eliminating the need for a manual metering rate calibration, metering calibration speed and accuracy is automated and improved.

These and other objects, features and advantages of the present invention will become apparent to one skilled in the art from the description which follows taken in view of the drawings.

DESCRIPTION OF THE PREFERRED EMBODIMENT

Figure 1:
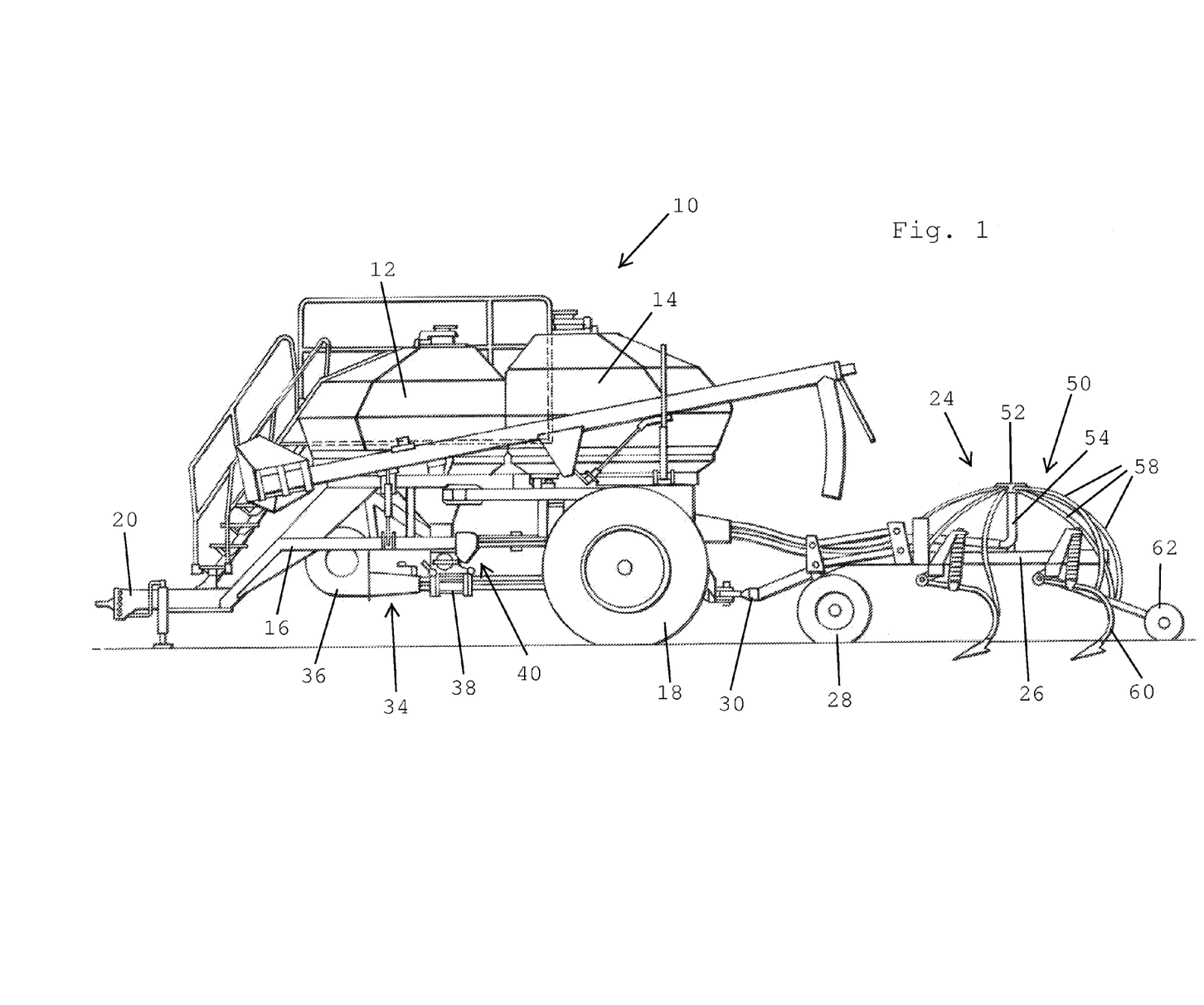
FIG. 1 is a side view of a seeding and/or fertilizing implement for delivering one or more materials to the ground.

Referring to FIG. 1, therein is shown a seeding and fertilizing implement 10 including tanks 12 and 14 for containing materials to be distributed to the soil. The tanks 12 and 14 are mounted on a frame 16 supported by ground wheels 18 for forward movement over the ground by a towing vehicle (not shown) connected to a forward hitch 20. A ground-engaging implement 24 includes a frame 26 supported by ground wheels 28 and connected to the rear of the frame 16 by a hitch 30.

An air system 34 includes a fan 36 connected to the frame 16 and directing air rearwardly through material delivery conduit structure 38. Material metering structure 40 delivers the materials from the tanks 12 and 14 through venturi structure 42 and 44 into the material delivery conduit structure 38. The material is then carried rearwardly in the air stream to secondary distribution towers 50. Each tower 50 includes an uppermost distributing head 52 located at the uppermost end of a vertical distribution tube 54. The head 52 evenly divides the flow of material into a number of secondary distribution lines 58. Each distribution line 58 delivers material to a furrow formed by one of a plurality of openers 60 attached to the frame 26 at transversely spaced locations, and a trailing firming or closing wheel 62 associated with each opener 60 firms the soil over the material deposited in the furrow.

The material metering structure 40 includes variable speed meter drives 72 and 74 (FIG. 2) connected to material metering structures 76 and 78 located in the bottom of the tanks 12 and 14. As the drives 72 and 74 rotate the metering structures 76 and 78, materials from the tanks 12 and 14 are delivered via venturi 42 and venturi 44 into the conduit structure 38 which, in turn, conveys the materials to the distribution tower 50. A feed rate controller 80 connected to the variable speed meter drives 72 and 74 receives a speed signal at an input 82 indicative of implement ground speed and adjusts the meter drive speeds to maintain a selected flow rate with changing ground speed. An input device 86 is connected to the controller 80 for entering a desired material mass flow rate and for setting the metering structure 40 at a nominal mass flow rate. The device 86 can include a GPS-based system or other automated system to provide desired metering rates to a processor 90. The processor 90 provides rate control inputs to the controller 80 at 92 and 94. An operator and/or the feed rate controller utilizes the speed signal and the inputs from the processor 90 to adjust the drives 72 and 74 to maintain the desired flow rates.

Figure 2:
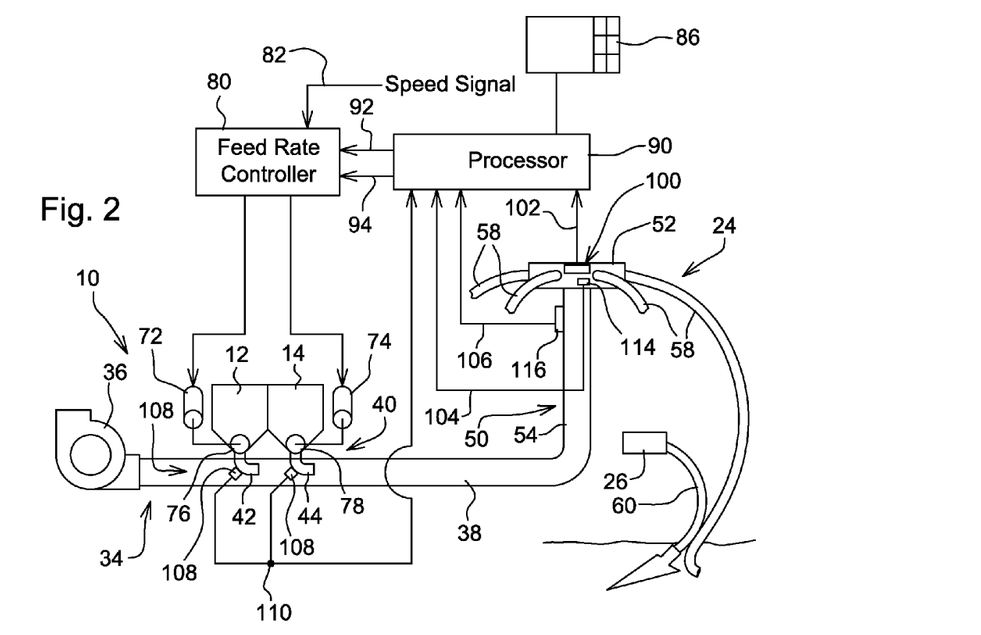
FIG. 2 is a schematic representation of distributing structure for the implement of FIG. 1, the structure including a mass flow sensor and processing and control structure.

A mass flow rate sensor 100 is located in the secondary distribution tower 50 used to divide the seed and/or fertilizer flow into individual rows. The metered materials bounce off of the sensor 100 and change direction. The individual row air streams in the conduits 58 then deliver the material to the furrow. The sensor 100 provides a signal at an input to the processor 90 indicative of the force of the material against the sensor which is dependent on material mass. The processor 90 calculates mass flow rate from the force signal received at the input 102.

The processor 90 also receives one or more additional signals at inputs 104 and 106 indicative of unwanted noise and/or interference or other variable that can adversely affect the calculated mass flow rate. The processor 90 utilizes the additional signal or signals at the inputs 104 and 106 to provide a correction signal and calculate a more accurate mass flow rate. For further accuracy improvement, especially for low mass seeds like canola, additional flow indication signals can be provided by meter output sensor structure 108 located upstream of the first sensor 100 and including outputs 110 connected to an input of the processor 90. As shown, the sensor structure 108 includes flow sensors located at the outputs of the metering structures 76 and 78. An example of an additional sensor is an optical sensor or other conventional seed flow detector at the output of the metering structure 40 for sensing seeds and providing an input signal to the processor 90 indicative of seed mass or mass flow of a first material from tank 12. From the seed mass flow (or mass flow A) and the total mass flow calculation based upon the signal from the impact sensor 100 (mass flow A+B), the mass flow of the fertilizer or a second material in the tank 14 can be calculated [mass flow B =(mass flow A+B)-(mass flow A)].

In the embodiment shown in FIG. 2, the input 104 is connected to a vibration sensor 114 mounted on or in close proximity to the impact sensor 100. During brief interruptions of material flow from the metering structure 40, average vibration signals from the air flow and implement movement can be determined by the processor 90 from the signal at the input 104. The average vibration signals are then subtracted from the total mass flow sensor signal generated when material flows in the system so that a more accurate indication of mass flow is achieved.

In the embodiment shown in FIG. 2, an air sensor 116 placed in a non-interfering location in the upright tube 54 provides an air signal to the input 106. The sensor 116 can provide an air velocity and/or air pressure indications to the processor 90. For example, the air velocity in the tube 54 affects the velocity of the material or materials in the secondary tower 50 which, in turn, affects the impact force against the mass flow sensor 100. The velocity signal at the input 106 is utilized to provide a correction of the force sensor signal at the input 102 to compensate for air velocity and more accurately reflect mass flow. The signal from the sensor 116 can also be utilized to compensate for other atmospheric-related variations such as varying air pressure at the distribution head 52.

A single sensor 100 or multiple sensors 100 up to the number of secondary towers can be used. If the number of sensor is less than the number of secondary towers, one sensor acts as a proxy for other secondary distribution towers 50.

With some implement configurations seed and fertilizer are individually contained in the tanks 12 and 14 and are mixed in the same air stream and in the secondary distribution tower 50. To separate the seed mass flow indication from the fertilizer mass flow indication, the processor 90 employs a software algorithm to temporarily increase the metering rate of one of the materials by changing the speed of one of the drives 72 and 74. The processor 90 then calculates the change in mass flow rate resulting from the speed change. Using the mass flow rate change and the meter speed change, the processor 90 calculates a calibration factor from which the approximate rate of the individual materials can be calculated. The procedure allows on-the-go calibration of multiple meters and can provide such calibration without the need to completely stop one of the materials if so desired.

By providing one or more interference or air flow signals in addition to the mass sensor signal from the impact plate which faces the primary mass flow, the processor can negate the detrimental effects of air flow and/or pressure variations, vibrations and various other extraneous factors. For example, in one embodiment of the invention, a vibration sensor 120 (FIG. 5) is connected to the sensor 100. During brief interruptions of material flow from the metering structures 76 and 78, average vibration signals from the air flow and implement movement can be determined by the processor 90. During material delivery, the processor 90 subtracts the average vibration signals from the total mass flow sensor signal generated by the sensor 100 to provide a more accurate indication of mass flow.

Figure 5:
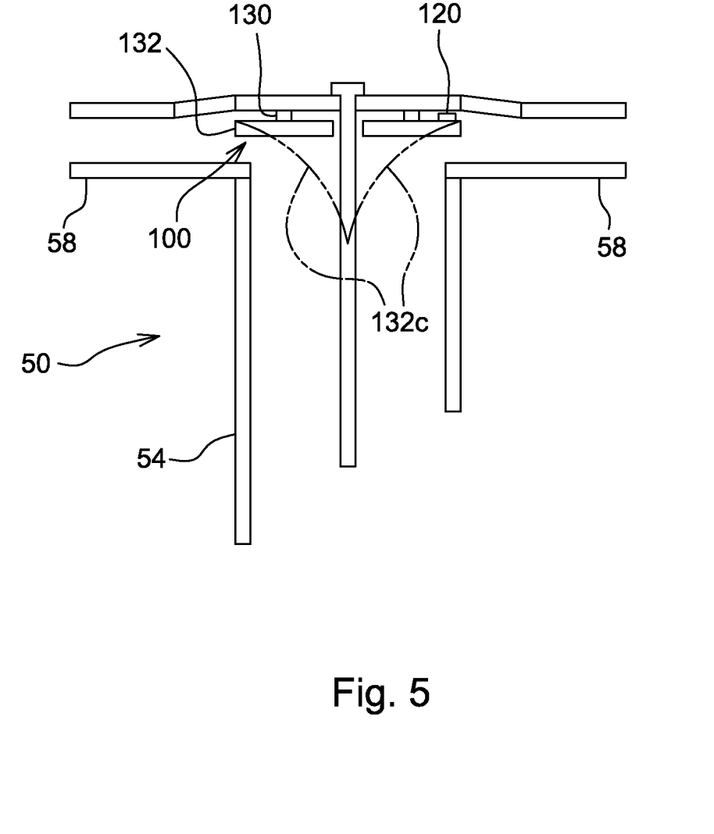
FIG. 5 is an enlarged schematic view of a granular mass flow sensor in the distributing structure of the implement of FIG. 1.

Various types of sensors 100 may be utilized. As shown in FIG. 5, the sensor 100 includes a washer-type of load cell 130 connected to a larger washer-shaped impact plate 132 at the top of the upright tube 54. The diameter of the impact plate 132 is approximately equal to the diameter of the tube 54 so that substantially all the material delivered through the tube 54 impacts the plate before exiting through the distribution lines 58. Although the impact plate 132 is shown as flat, other surface shapes may also be used including curved and/or cone-shaped surfaces (see the broken lines at 132c of FIG. 5) that can help to more evenly distribute the materials to the lines 58.

Figure 3:
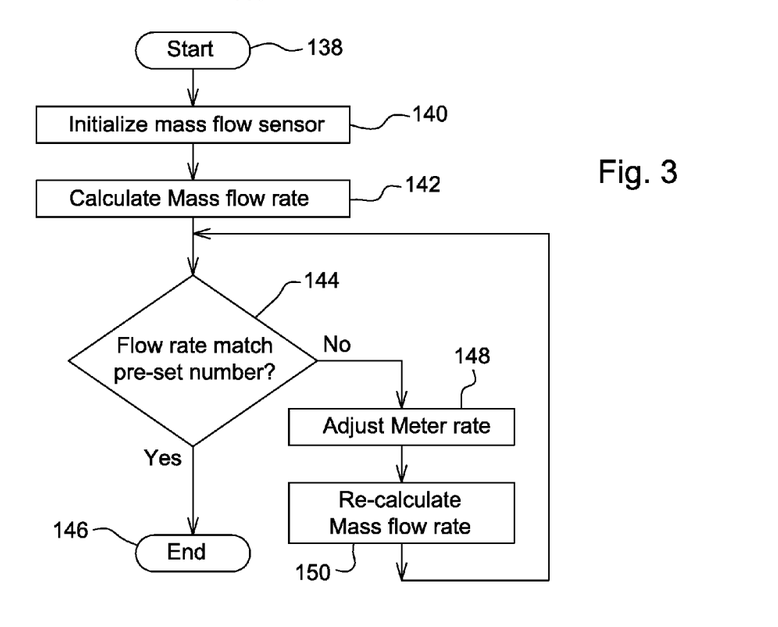
FIG. 3 is a diagram of the flow chart for the processor of FIG. 2 for adjusting flow rate of the delivered material.

In operation, the processor 90 begins the calibration routine at 138 (FIG. 3) and initializes the mass flow sensor 100 at 140. The processor 90 then calculates a mass flow rate at 142 from the signals from the various detectors. The calculated flow rate is then compared with a preset desired flow rate at 144. If the calculated flow rate matches the preset rate, the calibration cycle is ended at 146 for a preselected period of time after which the calibration cycle is restarted. If the flow rate does not match the desired flow rate, the speeds of the metering drives 72 and 74 are varied at 148 and the mass flow rate is recalculated at 150 until the flow rate matches the desired rate at 144.

Figure 4:
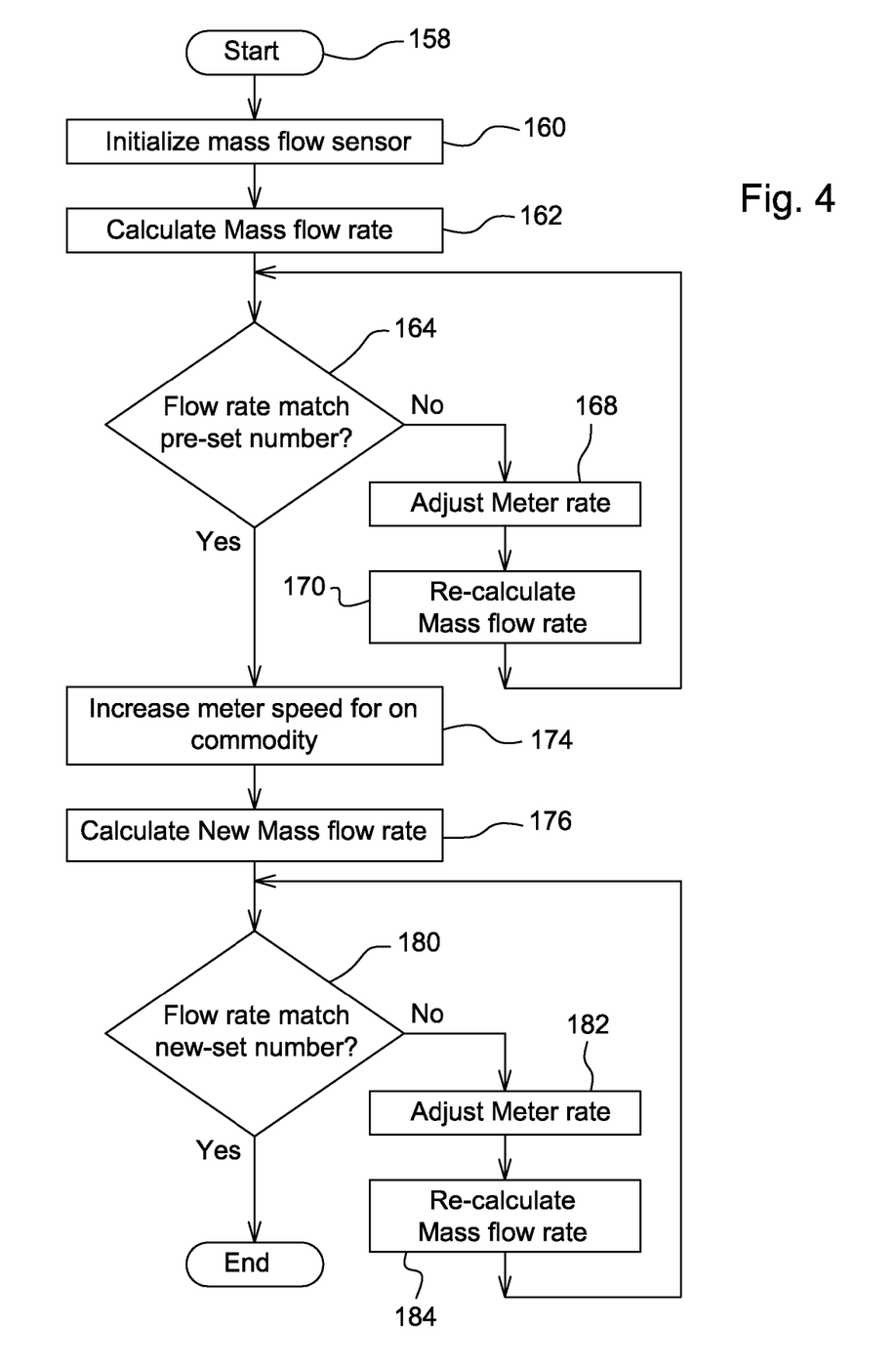
FIG. 4 is a diagram similar to that of FIG. 3 but including the procedure for calculating individual flow rate when at least two different materials are being conveyed.

To separate the mass flow indication of the material in the tank 12 from the mass flow indication of the material in the tank 14, the processor 90 employs a software algorithm shown schematically at FIG. 4 to temporarily increase the metering rate of one commodity by changing the speed of one of the drives 72 and 74. A new mass flow rate is then calculated from which the processor 90 determines the mass flow rates of the individual materials from the bins 12 and 14. Relative meter speeds are then adjusted as necessary to provide the overall metering rate with the proper individual material rates.

As shown in FIG. 4, the calibration routine is started at 158, and the mass flow sensor 100 is initialized at 160. A mass flow rate of the combined materials from the tanks 12 and 14 is calculated at 162, and the flow rate is compared to a preselected number at 164. If the overall flow rate is not within the selected range, the meter rate is adjusted at 168 and recalculated at 170 until the overall rate is within the desired range. Once the flow rate is determined at 164 to be within the desired range, the meter speed for one of the commodity meters 76 and 78 is temporarily increased at 174 and a new mass flow rate is determined at 176. For given flow rates and commodity masses, the change in the mass flow rate occasioned by the known meter speed change of one of the commodities at 174 should provide a given change in mass flow rate. The new mass flow rate is compared at 180 to a newly determined flow rate number that is dependent upon the meter speed change at 174. If the flow rate change does not match the flow rate change calculated by the processor 90 for the given increase in speed of one of the commodity meters at 174, the meter rate for that meter is adjusted at 182 and mass flow rate again is calculated at 184 after the adjustment until the calculated flow rate matches determined flow rate number dependent on the meter speed change. Once the adjustment routine of FIG. 4 is completed and the desired rate or ratio of commodities from the tanks 12 and 14 is being delivered for the meters 76 and 78 for the increased meter speed of one of the commodities at 174, the processor 90 causes the overspeed condition established at 174 to cease and returns control to the algorithm of FIG. 3. Periodically the processor 90 initiates the calibration routine of FIG. 4 to assure the desired ratios of materials are delivered to the soil. The calibration routine can be initiated for changing conditions, such as for meter speed changes that occur, for example, when ground speed has to be varied with changing field conditions.

In an embodiment of the invention, a closed loop control system utilizes the mass flow rate to adjust the metering rate for achieving desired flow rate. For example, a method of accurately providing the flow rate includes the following steps:

1. programming the processor 90 for the desired mass flow rate for seed and/or nutrients (or other chemicals);
2. adjusting the processor 90 and controller 80 to set the metering device at a nominal mass flow rate using an approximate standard meter calibration value;
3. providing a calibration cycle; and
4. utilizing the information from the calibration cycle to refine the calibration value and readjust the metering rate to a precise metering rate.

By eliminating the need for a manual metering rate calibration, metering calibration speed and accuracy are automated and improved.

Having described the preferred embodiment, it will become apparent that various modifications can be made without departing from the scope of the invention as defined in the accompanying claims.

The invention claimed is:

1. A flow determining device for an air seeding and/or fertilizing machine that includes a source of particulate material and material metering structure, an air delivery system for conveying the material from the source to the ground, the sensor comprising;

a first sensor located in the air delivery system for providing a first signal indicative of the force of the particulate material impacting the first sensor;

a second sensor located in the air delivery system for providing an interference signal indicative of one or more variables that negatively impact first sensor accuracy; and a processor connected to the first and second sensors for determining a particulate material mass flow signal in dependence on the impact sensor signal and the interference signal wherein the processor is responsive to the first signal and to a change of metering rate of one of two materials to determine individual material mass flow rate.

2. The flow determining device of claim 1 wherein the first sensor comprises an impact sensor providing an impact signal, wherein the first sensor is located in a divider head of a distribution tower.

3. The flow determining device of claim 2 wherein the second sensor includes a vibration sensor.

4. The flow determining device of claim 1 wherein the second sensor provides an interference signal indicative of a variable, the variable including at least one of:
airflow, air pressure drop, vibration and differential pressure variation.

5. The flow determining device of claim 2 wherein the impact sensor includes a non-flat surface for facilitating distribution of the materials from the divider head uniformly to distribution lines.

6. A flow determining device for an air seeding and/or fertilizing machine that includes a source of particulate material and material metering structure, an air delivery system for conveying the material from the source to the ground, the sensor comprising;
a first sensor located in the air delivery system for providing a first signal indicative of the force of the particulate material impacting the first sensor;
a second sensor located in the air delivery system for providing an interference signal indicative of one or more variables that negatively impact first sensor accuracy;
a processor connected to the first and second sensors for determining a particulate material mass flow signal in dependence on the impact sensor signal and the interference signal; and
a meter sensor for providing an indication to the processor of mass flow of a material A delivered by the material metering structure to the air delivery system, wherein the metering structure also delivers a material B to the air delivery system, and wherein the processor is responsive to the first signal to provide a total mass flow indication of mass flow of the material A and the material B.

7. The flow determining device of claim 6 wherein the meter sensor comprises a seed flow sensor and the mass flow A comprises seed flow, wherein the mass flow B comprises chemical flow, wherein the processor provides separate seed flow and chemical flow indications.

8. A flow determining device for an air seeding and/or fertilizing machine that includes a source of particulate material and material metering structure, an air delivery system for conveying the material from the source to the ground, the sensor comprising;
a first sensor located in the air delivery system for providing a first signal indicative of the force of the particulate material impacting the first sensor;
a second sensor located in the air delivery system for providing an interference signal indicative of one or more variables that negatively impact first sensor accuracy; and
a processor connected to the first and second sensors for determining a particulate material mass flow signal in dependence on the impact sensor signal and the interference signal and;
a rate control for adjusting the rate of delivery of two particulate materials, the processor responsive to the change in the first signal and to the adjustment of the rate to determine the mass flow rate of the individual particulate materials.

9. A flow determining device for an air seeding and/or fertilizing machine that includes a source of particulate material and material metering structure, an air delivery system for conveying the material from the source to the ground, the sensor comprising;
a first sensor located in the air delivery system for providing a first signal indicative of the force of the particulate material impacting the first sensor;
a second sensor located in the air delivery system for providing an interference signal indicative of one or more variables that negatively impact first sensor accuracy; and
a processor connected to the first and second sensors for determining a particulate material mass flow signal in dependence on the impact sensor signal and the interference signal and;
a control for operating the metering device at a nominal mass flow rate in a calibration cycle using an approximate standard meter calibration value including an input device for entering a desired material mass flow rate, and means for setting the metering device at the nominal mass flow rate, wherein the processor is responsive to the information from the calibration cycle to refine the calibration value and controller readjusts metering rate to a precise metering rate.

10. A method of determining flow in an air seeding and/or fertilizing machine that includes a source of particulate material, metering structure, and an air delivery system including an upright distribution tower for conveying the material metered from the source to the ground, the method comprising;
locating a first sensor in the distribution tower;
providing a first signal indicative of the force of the particulate material impacting the first sensor;
locating a second sensor in the air delivery system;
providing an interference signal indicative of one or more variables that negatively impact first sensor accuracy utilizing the second sensor; and
determining a particulate material mass flow rate in dependence on the impact sensor signal and the interference signal.

11. The method of claim 10 wherein the step of locating the first sensor comprises locating an impact sensor at the uppermost portion of the upright distribution tower.

12. The method of claim 10 wherein the step of locating the first sensor comprises locating the sensor in a divider head of the distribution tower.

13. The method of claim 10 wherein the step of locating a second sensor in the air delivery system includes locating a vibration sensor adjacent the first sensor.

14. The method of claim 10 wherein the step of locating a second sensor in the air delivery system includes locating an air sensor in the air delivery system.

15. The method as set forth in claim 10 including the further steps of
a. entering a desired mass flow rate for at least two materials into a rate control device;
b. setting the metering structure to provide a nominal mass flow rate;
c. providing a calibration cycle; and
d. utilizing information from the calibration cycle to adjust the metering rate to a desired rate.

16. The method as set forth in claim 10 including the further steps of;
a. metering two different materials simultaneously through the distribution tower;
b. changing the metering rate of one of the two different materials;
c. determining from at least the first signal a new particulate material mass flow rate; and
d. from the new particulate material mass flow rate, calculating the individual mass flow rate of at least one of the two different materials.

17. The method as set forth in claim 10 including providing a third sensor adjacent the metering structure upstream of the air distribution conduit structure.

18. The method as set forth in claim 17 wherein the step of providing the third sensor comprises locating sensing structure at meter outputs.

19. The method as set forth in claim 17 including the step of simultaneously metering seed and chemical into the air delivery system, wherein the step of providing the third sensor comprises providing a seed sensor, and including the step of determining an individual metering rate of at least one of the seed and the chemical from signals from the third sensor and the first sensor.

* * * * *